United States Patent [19]
Kriechbaum et al.

[11] 3,892,151
[45] July 1, 1975

[54] TUBE TAPERING APPARATUS

[75] Inventors: Karl Kriechbaum; Karl Ahrens, both of Kassel, Germany

[73] Assignee: Licentia-Patent-Verwaltungs-G.m.b.H., Frankfurt am Main, Germany

[22] Filed: June 18, 1974

[21] Appl. No.: 480,923

[30] Foreign Application Priority Data
June 23, 1973 Germany............................ 2332120
June 23, 1973 Germany............................ 7323463

[52] U.S. Cl.................................................. 82/4 C
[51] Int. Cl............................................... B23b 3/22
[58] Field of Search.................................. 82/4, 4 C

[56] References Cited
UNITED STATES PATENTS

| | | | |
|---|---|---|---|
| 596,295 | 12/1897 | French................................ | 82/4 C |
| 2,842,236 | 7/1958 | Shaw et al............................. | 82/4 C |
| 3,744,356 | 7/1973 | Slator et al........................... | 82/4 C |
| 3,807,047 | 4/1974 | Sherer................................. | 82/4 C |
| 3,813,747 | 6/1974 | Hertel................................. | 82/4 C |

*Primary Examiner*—Harrison L. Hinson
*Attorney, Agent, or Firm*—Spencer & Kaye

[57] ABSTRACT

A tube tapering apparatus has a support member which can be clamped to the outer face of the tube to be machined, a stationary cylindrical carrier member surrounding the support member and having an axis that coincides with the axis of the tube. A cylindrical mounting member surrounds the carrier member and is rotatable and linearly displaceable by motor devices with respect to the carrier member. A machining tool is secured to the mounting member to move therewith as a unit. The machining tool provides a conical taper on one tube end.

14 Claims, 1 Drawing Figure

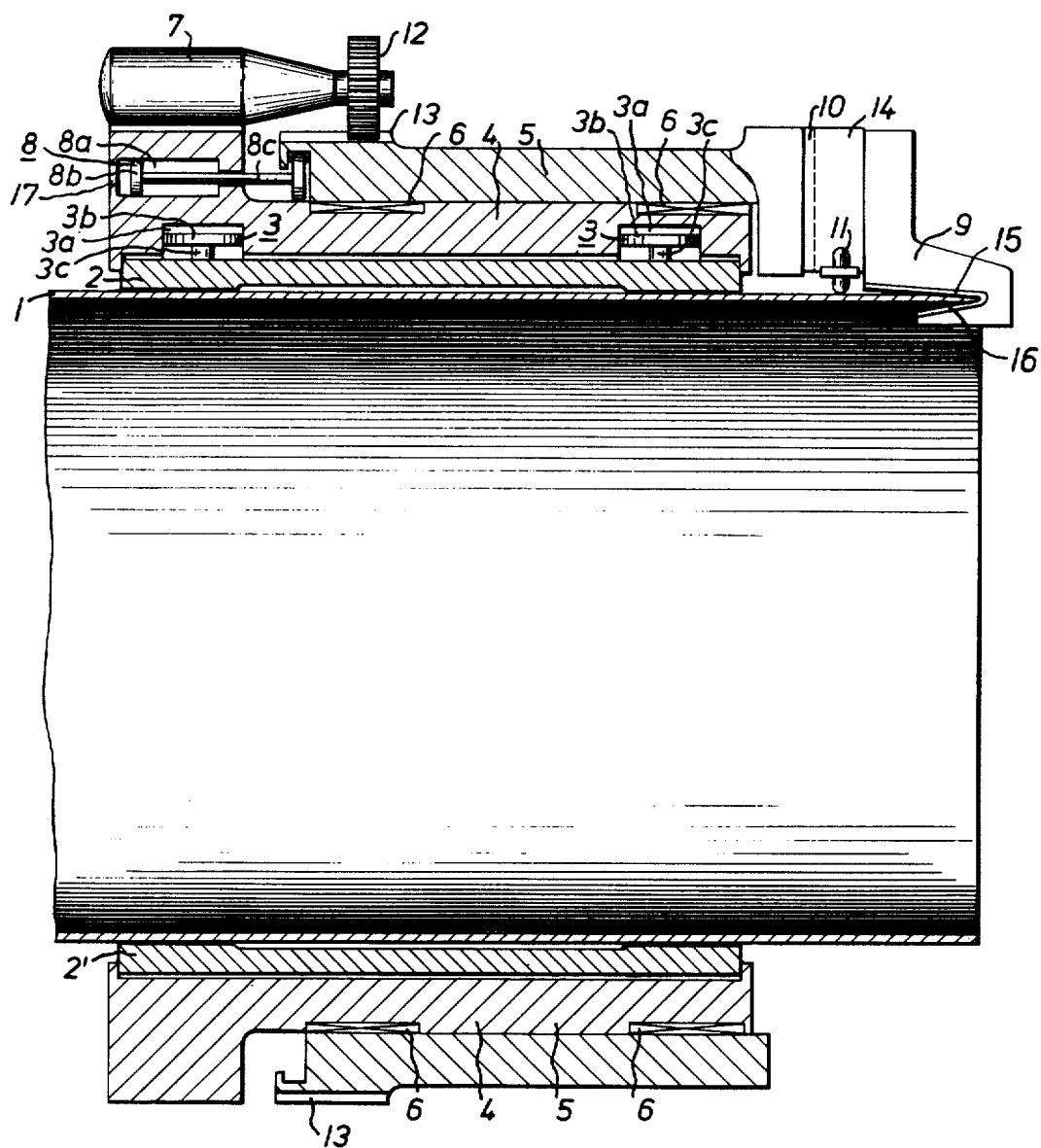

TUBE TAPERING APPARATUS

BACKGROUND OF THE INVENTION

This invention relates to an apparatus for providing, by a machining operation, a conical taper at the ends of thin-walled tubes of relatively large diameter.

In the manufacture of sealed, pressure tight tubular electric conduits it has already been proposed to taper both ends of the tubes and to splice them for obtaining an electric connection therebetween (German Published Patent Application No. 2,255,285). In such operation one end of the tube is provided with an inner cone whereas the other end will have an outer cone. To provide an electrically conductive connection between the two tubes, the latter are arranged end-to-end, with an outer and an inner conical taper facing one another and telescoped into one another by means of a high pressure press. It is desirable that during this operation slight plastic deformation of the tube ends occur.

It is difficult and circumstantial to machine, with known lathes, the relatively wide and thin-walled aluminum tubes which may have a diameter of approximately 600 mm in case of a wall thickness of approximately 6 mm and which, at least in part, are not perfectly circular.

SUMMARY OF THE INVENTION

It is an object of the invention to provide an improved apparatus which makes possible the conical tapering of tube ends with simple means without the aid of lathes.

This object and others to become apparent as the specification progresses, are accomplished by the invention, according to which, briefly stated, the tube tapering apparatus has a support member which can be clamped to the outer face of the tube to be machined, a stationary cylindrical carrier member surrounding the support member and having an axis that coincides with the axis of the tube. A cylindrical mounting member surrounds the carrier member and is rotatable and linearly displaceable by motor devices with respect to the carrier member. A machining tool is secured to the mounting member to move therewith as a unit. The machining tool provides a conical taper on one tube end.

BRIEF DESCRIPTION OF THE DRAWING

The sole FIGURE illustrates in longitudinal section a preferred embodiment of the invention adapted to provide an external conical taper on a tube end.

DESCRIPTION OF THE PREFERRED EMBODIMENT

Turning now to the sole FIGURE, there is shown a relatively thin-walled and relatively large-diameter tube 1, the right-hand terminus of which is to be provided with a conical taper by a machining operation.

On the outer surface of the tube 1, adjacent to that end which is to be machined, there are arranged at least two circumferentially spaced, tube-engaging support members 2, 2' which may be bar-like components extending parallel to the tube axis. In the example described, the support members 2, 2' are diametrically opposed with respect to the axis of the tube 1. The support members are surrounded by a cylindrical carrier member such as a sleeve 4 which has an axis that coincides with the tube axis. Each support member 2, 2' is clamped against the tube 1 by a tightening mechanism 3 (shown only for the support member 2) held in the carrier sleeve 4. The tightening mechanism may be of the hydraulic type which includes a hydraulic cylinder chamber 3a formed in the carrier sleeve 4, a piston 3b movable with a snug fit in the chamber 3a and a piston rod 3c by means of which the piston 3b is affixed to associated support member 2 or 2'. When the chamber 3a is pressurized from a conventional source supplying a hydraulic medium under pressure, the support members 2, 2' are firmly pressed against the tube 1 and thus the support members 2, 2' as well as the surrounding carrier sleeve 4 are stationarily mounted on the tube 1. It is noted that in the given example each support member 2, 2' is pressed against the tube 1 by two tightening mechanisms 3 arranged in the vicinity of the two ends of each support member.

The carrier sleeve 4 is surrounded by a cylindrical mounting member such as a mounting sleeve 5 which is supported by the carrier sleeve 4 by means of bearing devices 6 for permitting a low friction displacement of the mounting sleeve 5 with respect to the stationary carrier sleeve 4 in a circumferential direction about the tube axis and in an axial direction parallel to the tube axis.

To the carrier sleeve 4 there is mounted a stationary motor 7, the output shaft of which carries a pinion gear 12 that meshes with a ring gear 13 affixed to the periphery of the mounting sleeve 5 in a coaxial relationship with respect to the carrier sleeve 4. It is thus seen that when the motor 7 (which may be an electric motor or a hydraulic motor) is driven, the mounting sleeve 5 executes a rotation about the stationary tube 1.

A linear displacement of the mounting sleeve 5 parallel to the tube axis is effected by a power mechanism 8 which in this embodiment is a hydraulic cylinder assembly. It comprises a hydraulic cylinder chamber 8a, a piston 8b disposed with a snug fit in the chamber 8a and a piston rod 8c which connects the piston 8b with the mounting sleeve 5. It is noted that the connection between the piston rod 8c and the mounting sleeve 5 is effected in such a manner that the rod 8c does not hinder the rotation of the mounting sleeve 5 if driven by the motor 7. For moving the mounting sleeve 5 linearly into the one or the other direction parallel to the tube axis 1, the one or the other side of the hydraulic chamber 8a is pressurized by a hydraulic medium supplied by a conventional source. It is noted that the width of the ring gear 13 measured in a direction parallel to the axis of the tube 1 is so designed that the operative meshing connection between the pinion 12 and the ring gear 13 is maintained at all times even in case of the maximum linear excursion of the mounting sleeve 5. While in the FIGURE there is shown only one power device 8, it is to be understood that more than one such device may be disposed, for example, in a circumferentially spaced manner in the carrier sleeve 4. The power device 8 may also be a spindle mechanism. If a spindle mechanism is used, the rod 8c is provided with a thread and prolonged trough the carrier sleeve 4 at the point 17. On this place a tap hole is fixed in the carrier sleeve, which mashes with the thread of the rod 8c. A linear displacement of the mounting sleeve 5 parallel to the tube axis is then effected by turning the rod 8c with a handwheel fastened on it (not shown).

To that end of the mounting sleeve 5 which is adjacent the tube terminus, there is mounted, for example, in a rigid manner, a metal machining tool 9 for providing a conical taper on the tube end. By virtue of the connection between the tool 9 and the mounting sleeve 5, the tool 9 follows the movement of the mounting sleeve 5 as a unit.

In order to ensure, however, that during the orbital movement of the tool 9 caused by the rotation of the mounting sleeve 5, the tool follows exactly the curvature of the tube 1, between the tool 8 and the mounting sleeve 5, there is provided a dove-tail guide 10 which permits a radial displacement of the tool 9 with respect to the axis of the tube 1. A block member 14 which contains one-half of the dove-tail connection and which is affixed to the tool 9 carries a roller 11 which engages the outer surface of the tube 1 and which thus acts as a follower, adjusting the position of the tool 9 in the radial direction dependent upon the shape of the tube 1.

In addition, there can be a second roller engaging the inner surface of the tube 1 in opposit of the roller 11. The second roller is then beared by a bended holder arm, wich is fixed at the block member 14 (not shown).

It is seen from the Figure that the particular tool shown there in is adapted to provide an external conical taper on the tube by the blade 15. It is to be understood that, by providing an appropriately shaped tool holder arm, the tool 9 may be so supported that it machines the internal surface of the tube 1 by the second blade 16 thus providing an internal conical taper.

It will be understood that the above description of the present invention is susceptible to various modifications, changes and adaptations, and the same are intended to be comprehended within the meaning and range of equivalents of the appended claims.

We claim:

1. An apparatus for conically tapering an end of a tube having an axis, comprising in combination:
    a. support means engaging the outer face of said tube;
    b. tightening means for clamping said support means to said tube;
    c. a cylindrical carrier member surrounding said support means and having an axis coinciding with the tube axis when in place on the tube;
    d. connecting means for stationarily attaching said carrier member to said support means;
    e. a cylindrical mounting member surrounding said carrier member;
    f. bearing means supporting said mounting member on said carrier member;
    g. first motor means mounted on said carrier member and connected to said mounting member for rotating the latter relative to said carrier member;
    h. second motor means connected to said mounting member for linearly displacing the latter relative to said carrier member;
    i. a machining tool disposed adjacent an end of said mounting member for moving together with said mounting member to provide a conical taper on the tube end; and
    j. securing means for attaching said machining tool to said mounting member.

2. An apparatus as defined in claim 1, said securing means rigidly connecting said machining tool to said mounting member.

3. An apparatus as defined in claim 1, said securing means including means for providing for radial movement of said machining tool with respect to said cylindrical mounting member.

4. An apparatus as defined in claim 3, said means for providing for radial movement being constituted by a dove-tail connection.

5. An apparatus as defined in claim 3, including a follower means affixed to said machine tool for engaging the outer face of the tube.

6. An apparatus as defined in claim 5, wherein said follower means is at least one roller.

7. An apparatus as defined in claim 1, said machine tool having two cutters of different orientation for selectively using one or the other cutter for providing an inner or an outer conical taper on the tube end.

8. An apparatus as defined in claim 1, wherein said first motor means is an electromotor.

9. An apparatus as defined in claim 1, wherein said first motor means is a hydraulic motor.

10. An apparatus as defined in claim 1, wherein said second motor means is a hydraulic power cylinder.

11. An apparatus as defined in claim 1, said support means including at least two members situated diametrically oppositely with respect to the axis of said carrier member.

12. An apparatus as defined in claim 1, said tightening means including a hydraulic power cylinder means.

13. An apparatus as defined in claim 12, said hydraulic cylinder means including means defining a cylinder chamber in said carrier member; a piston slidably received in said cylinder chamber; and a piston rod having one end attached to said piston and another end attached to said support means.

14. An apparatus as defined in claim 1, further comprising a pinion gear directly driven by said first motor means and a ring gear affixed to said mounting member and oriented coaxially with said carrier member; said pinion gear and said ring gear being in a meshing relationship with one another.

* * * * *